US007059897B2

(12) United States Patent
Smith et al.

(10) Patent No.: US 7,059,897 B2
(45) Date of Patent: Jun. 13, 2006

(54) RAPID EXCHANGE SYSTEM FOR TESTING WIRELESS NETWORKS

(75) Inventors: Steven L. Smith, Buford, GA (US); Chris R. Radosta, Cumming, GA (US); Mark Horton, Suwanee, GA (US); Daniel Silvernale, Roswell, GA (US); Christopher T. Schenken, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 10/950,188

(22) Filed: Sep. 24, 2004

(65) Prior Publication Data

US 2005/0082077 A1 Apr. 21, 2005

Related U.S. Application Data

(60) Provisional application No. 60/505,822, filed on Sep. 24, 2003.

(51) Int. Cl.
*H01R 13/60* (2006.01)

(52) U.S. Cl. .................. 439/527; 174/50; 439/374; 439/929

(58) Field of Classification Search ............... 439/527, 439/374, 532, 542, 545, 929; 174/50, 260
See application file for complete search history.

(56) References Cited

U.S. PATENT DOCUMENTS

| 3,822,049 A | 7/1974 | Saunders | 248/223.41 |
| 4,113,217 A | 9/1978 | O'Connell | 248/222.11 |
| 4,589,557 A | 5/1986 | Bollmann | |
| 4,714,303 A | 12/1987 | Suzuki et al. | 312/7.1 |
| 4,977,399 A | 12/1990 | Price et al. | 340/7.21 |
| 5,007,608 A | 4/1991 | Carroll, Jr. | |
| 5,031,074 A * | 7/1991 | Ravid | 361/683 |
| 5,095,500 A | 3/1992 | Tayloe et al. | 379/32.01 |
| 5,193,890 A | 3/1993 | Robertson, Jr. et al. | 312/7.1 |
| 5,398,276 A | 3/1995 | Lemke et al. | 379/21 |
| 5,481,588 A | 1/1996 | Rickli et al. | 374/32.01 |

(Continued)

FOREIGN PATENT DOCUMENTS

EP 0 673 804 A1 3/1995

(Continued)

OTHER PUBLICATIONS

"TEMS™ DriveTester" http://www.ericsson.com/services/tems/cdma/drivetester-cdma.shtml 1 Page, Published Jun. 24, 2004.

(Continued)

*Primary Examiner*—Michael C. Zarroli
(74) *Attorney, Agent, or Firm*—Alston & Bird LLP

(57) ABSTRACT

One embodiment of the system provides for removably mounting a signal testing unit to a suitable vehicle surface, and optionally provides for an electrical connector to a power source, GPS antenna, and cellular antennas such that moving a signal testing unit from one vehicle to another can be accomplished more easily. The mounting system includes a signal testing unit with a lip extending from each of two opposing sides of the testing unit and a bracket defined by a panel that is intermediate two inwardly opening U-shaped channels. Each U-shaped channel is positioned to slidably receive one of the lips extending from the side of the testing unit. The channels can receive a connector plate that has a lip extending from each of two opposing sides of the plate and an electrical connector positioned on the plate to align and mate with an electrical connector on the testing unit.

2 Claims, 4 Drawing Sheets

U.S. PATENT DOCUMENTS

| | | | |
|---|---|---|---|
| 5,561,839 A | 10/1996 | Österberg et al. | 455/446 |
| 5,599,080 A | 2/1997 | Ho | 312/334.7 |
| 5,752,164 A | 5/1998 | Jones | 455/454 |
| 5,946,612 A | 8/1999 | Johansson | 455/405 |
| 5,987,306 A | 11/1999 | Nilsen et al. | 455/67.11 |
| 5,991,622 A | 11/1999 | Henry, Jr. | 455/434 |
| 6,272,337 B1 | 8/2001 | Mount et al. | 455/423 |
| 6,315,255 B1 | 11/2001 | Chan et al. | 248/221.11 |
| 6,377,445 B1 | 4/2002 | Davis et al. | 361/683 |
| 6,400,690 B1 | 6/2002 | Liu et al. | 370/252 |
| 6,402,111 B1 | 6/2002 | Stewart et al. | 248/317 |
| 6,449,485 B1 | 9/2002 | Anzil | 455/456 |
| 6,603,966 B1 | 8/2003 | Sheffield | 455/423 |
| 6,702,604 B1 * | 3/2004 | Moscovitch | 439/374 |
| 2001/0004157 A1 | 6/2001 | Lance et al. | |
| 2002/0029108 A1 | 3/2002 | Liu et al. | 701/208 |
| 2003/0014286 A1 | 1/2003 | Cappellini | 705/5 |

FOREIGN PATENT DOCUMENTS

| | | |
|---|---|---|
| EP | 0 977 450 A2 | 2/2000 |
| FR | 2 725 311 A1 | 9/1994 |
| FR | 2 725 311 A1 | 9/1994 |
| FR | 2 721 363 A1 | 6/1995 |
| JP | 06060229 | 9/1995 |

OTHER PUBLICATIONS

"TEMS™ DriveTester" http://www.ericsson.com/services/tems/downloads/ds_drivetester.pdf 2 Pages, Published 2002.

TEMS™ Automatic WCDMA Take Control of Your Mobile Internet Quality of Service, Copyright 2001, pp. 1-2, (available at http:\\www.ericsson.com/services/tems/downloads/ds_automatic_wcdma.pdf), *Publication AE/LZT 123 6694, R1*.

TEMS™ Drive Tester CDMA An Innovative Drive Test Solution, Copyright 2003, pp. 1-4, (available at http:\\www.ericsson.com/service/internet/picov/get?DocNo=28701-FAP9010100), *Publication AE/LZT 123 7307, R3*.

TEMS™ Automatic WCDMA Take Control of Your Mobile Internet Quality of Service, Copyright 2001, pp. 1-2, www.ericsson.com, *Publication AE/LZT 123 6694, R1*.

TEMS™ Drive Tester CDMA An Innovative Drive Test Solution, (Copyright 2003), pp. 1-4, www.ericsson.com/tems, *Publication AE/LZT 123 7307, R3*.

Lisa Sigler, Assess Speech Quality with PESQ, now in TEMS™ Automatic, date unknown, p. 1 of 1.

TEMS™ Automatic Streamlined Operations And Improved QoS GSM/GPRS, CDMA, and TDMA, Copyright 2004, pp. 1-4, www.ericsson.com/tems, *Publication 287 01-FAP 901 0409 B*.

ERICSSON, TEMS™—Making Wireless Better, APAC Workshop, Sep. 2004, pp. 1-17.

TechNotes: Tools for Precision-A Tool Kit to Optimize WCDMA Networks, date unknown; p. 1 of 1 numbered p. 46, www.ericsson.com/tems.

Lisa Sigler, TEMS™ News, An Ericsson Newsletter, Jun. 2003 No. 2, pp. 1-8.

TEMS™ News, An Ericsson Newsletter, Q2 2004 No. 2 pp. 1-8.

TEMS™ News, An Ericsson Newsletter, Q3 2004, No. 3, pp. 1-8.

On The New World of Communication Magazine, Mar. 2002, pp. 1-50.

TEMS™ Tech Support: TEMS Automatic GSM Take Control Of Your Mobile Internet Quality Of Service, date unknown, pp. 1-3 www.ericsson.com/services/tems/support/sup_automatic_gsm.shtml.

TEMS™ Automatic Making Wireless Better Take Control Of Your Mobile Internet Quality Of Service, date unknown, pp. 1-2, www.ericsson.com/services/tems/cdma/automatic-cdma.shtml.

TEMS™ Tech Support: TEMS Drivetester CDMA Making Wireless Better: Instantly Isolate Network Trouble Spots, date unknown, pp. 1-2 www.ericsson.com/services/tems/support/drivetester/sup_drivetester_cdma.shtml.

TEMS™ Tech Support: TEMS Drivetester GSM/TDMA Making Wireless Better Instantly Isolate Network Trouble Spots, date unknown, pp. 1-2, www.ericsson.com/services/tems/support/drivetester/sup_drivetester_gsnm_tdma.shtml.

TEMS™ Tech Support: TEMS Linkplanner Making Wireless Better, FAQ's, date unknown, pp. 1-2, www.ericsson.com/services/tems/support/linkplanner/sup_linkplanner_faq_import.shtml.

TEMS™ Tech Support: TEMS Linkplanner Making Wireless Better, FAQ's, Map Data, date unknown, p. 1 of 1. www.ericsson.com/services/tems/support/linkplanner/sup_linkplanner_faq_mapdata.shtml.

TEMS™ Tech Support TEMS Linkplanner: Making Wireless Better FAQ's, General, date unknown, p. 1 of 1 www.ericsson.com/services/tems/support/linkplanner/sup_linkplanner_faq_general.shtml.

TEMS™ Drivetester CDMA2000 2.0 An Innovative Drive Test Slution for CDMA Networks, date unknown, p. 1 of 1, www.ericsson.com/products/TEMSdrivetesterCDMA200020pos.shtml.

TEMS™ Drive Tester CDMA An Innovative Drive Test Solution, Copyright 2005, pp. 1-4, www.ericsson.com/tems, *Publication 287 01-FAP 901 0539* Uen.

International Search Report for PCT/US2004/031618 filed Sep. 24, 2004.

Second Written Opinion for PCT/US2004/031618 filed Sep. 24, 2004.

International Search Report and Written Opinion dated Dec. 21, 2005 for PCT/US2005/031614 filed Feb. 9, 2005.

International Search Report and Written Opinion dated Jan. 17, 2006 for PCT/US2004/031618 filed Sep. 24, 2004.

* cited by examiner

RAPID EXCHANGE SYSTEM FOR TESTING WIRELESS NETWORKS

CROSS REFERENCE TO RELATED APPLICATIONS

This application claims priority from provisional U.S. Patent Application No. 60/505,822, entitled, "Bracket to Hold Mobile Testing Unit in Vehicle," which was filed Sep. 24, 2003, and which is incorporated herein by reference in its entirety.

BACKGROUND OF INVENTION

Signal network operators frequently use signal testing units to measure and improve signal coverage, such as cellular coverage, in a geographical area. The signal testing units are positioned in the coverage area and collect geographical position data and various radio communication related parameters, such as signal strength. This information is analyzed to troubleshoot and improve the coverage of cellular networks. Currently, signal network operators drive the signal testing units around a geographical area to collect data. Typically, the signal testing unit is placed in a vehicle in an unsecured manner or is semi-permanently mounted to the vehicle. When the signal testing unit is unsecured, it can be easily transferred from one vehicle to another, but the signal testing unit can be easily damaged, stolen, or interfere with operation of the vehicle. If the signal testing unit is semi-permanently mounted to the vehicle, then the unit cannot be easily transferred, and time and special tools may be required to remove and install the unit.

Multiple vehicles may be used to collect data in various locations. One option is to install the signal testing unit in each vehicle, but such an approach can be costly. Further, when a signal testing unit is transferred to another vehicle, antenna and power connections may be required. The signal testing unit may require connection to a GPS antenna that is external to the testing unit for determining the unit's location as well as cellular antenna(s) for collecting and reporting the data. Additionally, connection to the vehicle's power system may be required. Completing these connections may further complicate transferring a signal testing unit from one vehicle to another if the installation is not compatible with the design of the signal testing unit.

Therefore, there is a need for an apparatus that provides easy removal of a signal testing unit from one vehicle and installation in another, so as to facilitate the use of signal testing units in different vehicles at different times, for monitoring a signal network, such as a cellular network.

BRIEF SUMMARY OF THE INVENTION

The embodiments of mounting devices disclosed below provide for a bracket on which to mount a signal testing unit, and optionally provide for a connector to a power source, GPS antenna, and cellular antennas such that moving a signal testing unit from one vehicle to another can be accomplished more easily. The bracket may provide secure (e.g., preventing unauthorized removal) or non-secure mounting of the signal testing unit. The bracket can be installed in or on a fleet of vehicles to facilitate the movement of the signal testing unit from one vehicle to another by providing the operator with a common bracket and optional electrical connection in one centralized area for secure installation and operation of the unit.

In one embodiment, the mounting assembly includes a signal testing unit with a lip extending from each of two opposing sides of the testing unit and a bracket defined by a panel that is intermediate two inwardly opening U-shaped channels. Each U-shaped channel is positioned to slidably receive one of the lips extending from the side of the testing unit. In a further embodiment, the channels also receive a connector plate that has a lip extending from each of two opposing sides of the plate and an electrical connector positioned on the plate to align and mate with an electrical connector on the testing unit. In an alternative embodiment, the connector plate may be integrated into the channels.

DESCRIPTION OF INVENTION

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Generally the embodiments of mounting devices disclosed below provide for a bracket on which to mount a signal testing unit, and optionally provide for a connector to a power source, GPS antenna, and cellular antennas such that moving a signal testing unit from one vehicle to another can be accomplished more easily. The bracket may provide secure (e.g., preventing unauthorized removal) or non-secure mounting of the signal testing unit. The bracket can be installed in or on a fleet of vehicles to facilitate the movement of the signal testing unit from one vehicle to another by providing the operator with a common bracket and optional electrical connection in one centralized area for secure installation and operation of the unit.

Figures 1, 1A:
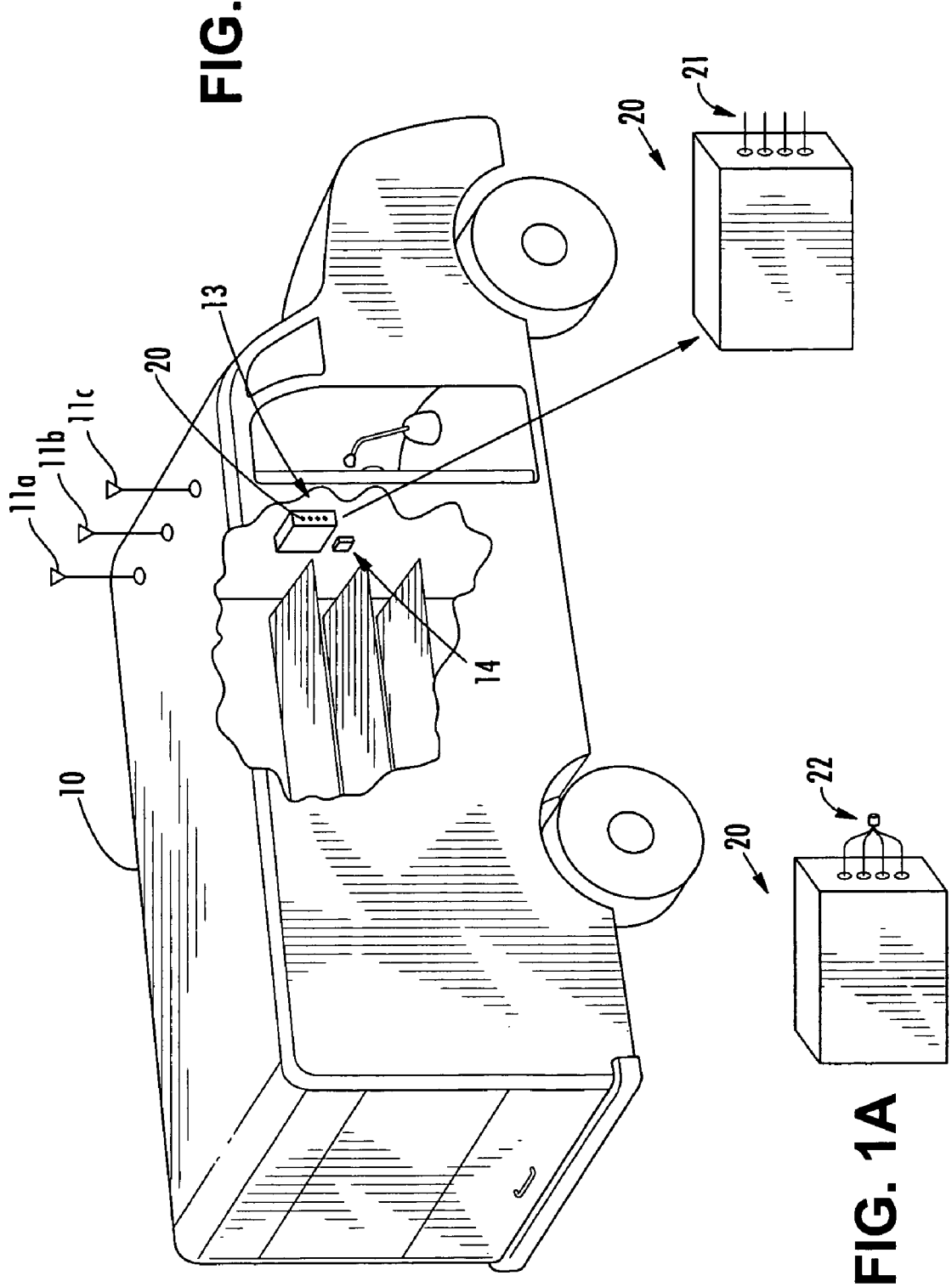
FIG. 1 is a schematic of a vehicle with a signal testing unit mounted to a surface of the vehicle.
FIG. 1A is an illustration of an embodiment of a signal testing unit with one electrical connector.

FIG. 1 depicts an embodiment of the system described above in which the signal testing unit 20 is mounted to a wall 13 inside the vehicle 10. In other embodiments, the testing unit 20 can be mounted against any suitable surface, such as a bulkhead, shelf, roof, floor, or exterior surface of the vehicle, using a bracket. The vehicle 10, which typically is a fleet vehicle, provides connections to a GPS antenna 11a, cellular antennas 11b, 11c, and a power source 14. In the embodiment shown in FIG. 1, the signal testing unit 20 has separate connectors 21 that connect with the power source 14, a GPS antenna 11a, and cellular antennas 11b, 11c. In another embodiment, as shown in FIG. 1A, the signal testing unit 20 includes one connector 22 that provides a connection with the power source 14, the GPS antenna 11a, and the cellular antennas 11b, 11c. In alternative embodiments, one or more of the antennas may be internal to the signal testing unit 20 and no connection to an external antenna 11a–c is required. Furthermore, the signal testing unit 20 may contain an internal energy source and not require connection to an external power source 14.

Figure 2:
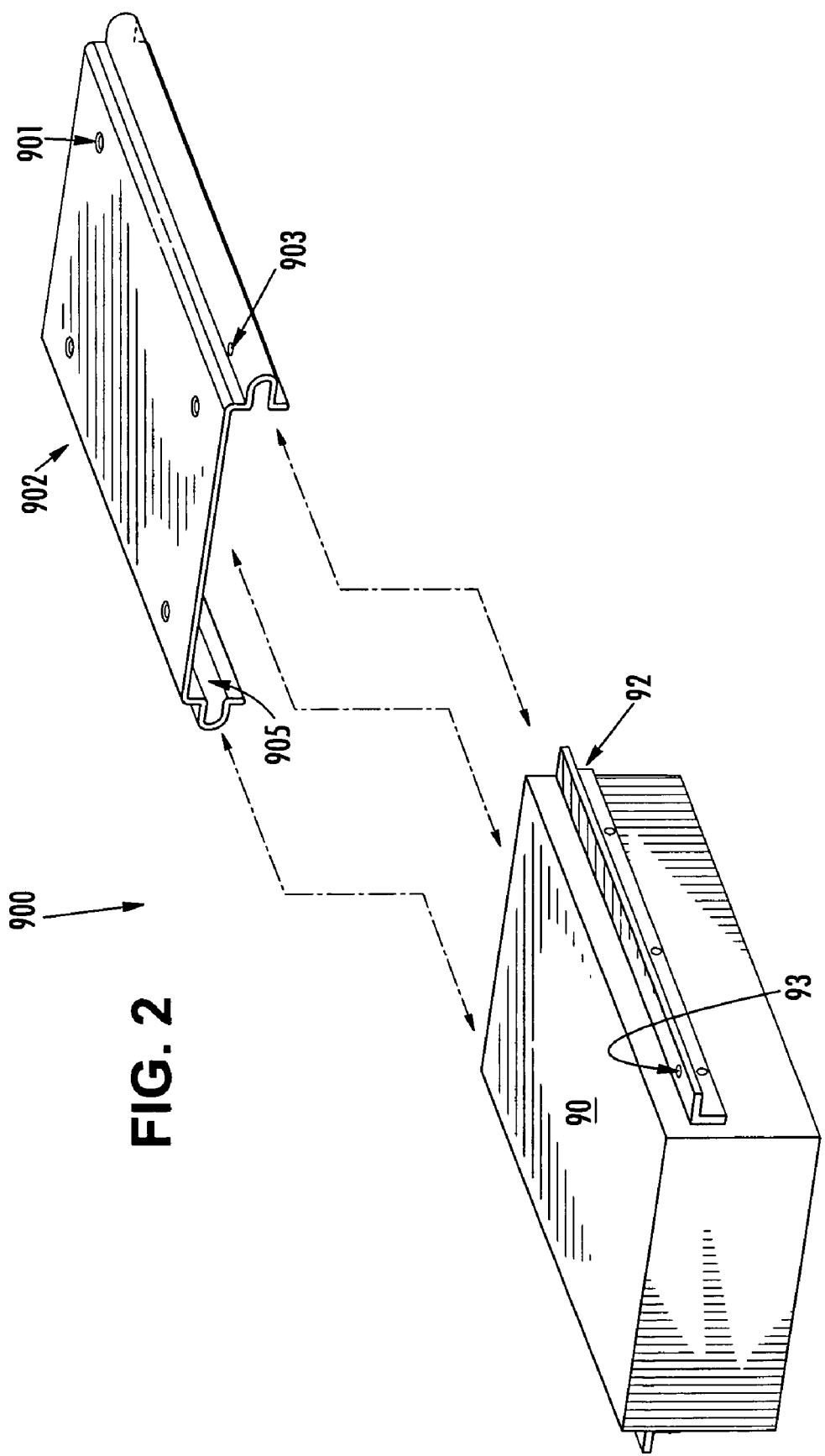
FIGS. 2–3 illustrate mounting assemblies and systems according to different embodiments of the invention.

FIG. 2 shows one embodiment of a mounting assembly 900 that includes a signal testing unit 90 with a lip 92 attached to, or formed onto, each of two opposing side faces of the signal testing unit 90. The mounting bracket 902 has a panel intermediate two inwardly opening U-shaped channels 905. The channels 905 are positioned each to slidably receive one of the lips 92 of the testing unit 90. The panel includes a fastener receiving portion 901, and is attached to a suitable vehicle surface 13 by engaging a fastener into each fastener receiving portion 901.

In one embodiment, the fastener receiving portion 901 is an aperture, and a bolt or screw is engaged through each aperture 901 and into the vehicle surface 13 to hold the bracket 902 in a substantially stable position relative to the vehicle surface 13. Alternative embodiments of the mounting bracket 902 may utilize fasteners such as pins, straps, clamps, adhesives, welds, or other suitable fasteners known in the art that can be used to secure the bracket 902 to the vehicle surface 13.

The mounting bracket 902 may be mounted, for example, under a shelf, in the orientation as shown, or it may be mounted, for example, on top of a shelf or other surface. Further, the bracket 902 may be mounted in a vertical orientation with sliding movement of the signal testing unit 90 in a side-to-side or up-and-down direction.

One of the lips 92 on the signal testing unit 90 defines an opening 93 that receives a locking mechanism, such as a padlock or locking cylinder. The U-shaped channel 905 that receives the lip with the opening 93 defines an opening 903 that receives a locking mechanism. The lips 92 of the signal testing unit 90 are slidably engaged into the channels 905 of the mounting bracket 902 until the opening 93 of the signal testing unit 90 is aligned with the opening 903 of the channel 905. A locking mechanism is then engaged into the openings 93, 903 to prevent unauthorized removal of the signal testing unit 90. Other lock-providing mechanisms can be substituted for the openings 93 and 903, such as a tab padlock and eye/hasp, locking cylinder, or other suitable locking mechanism known in the art.

Figure 3:
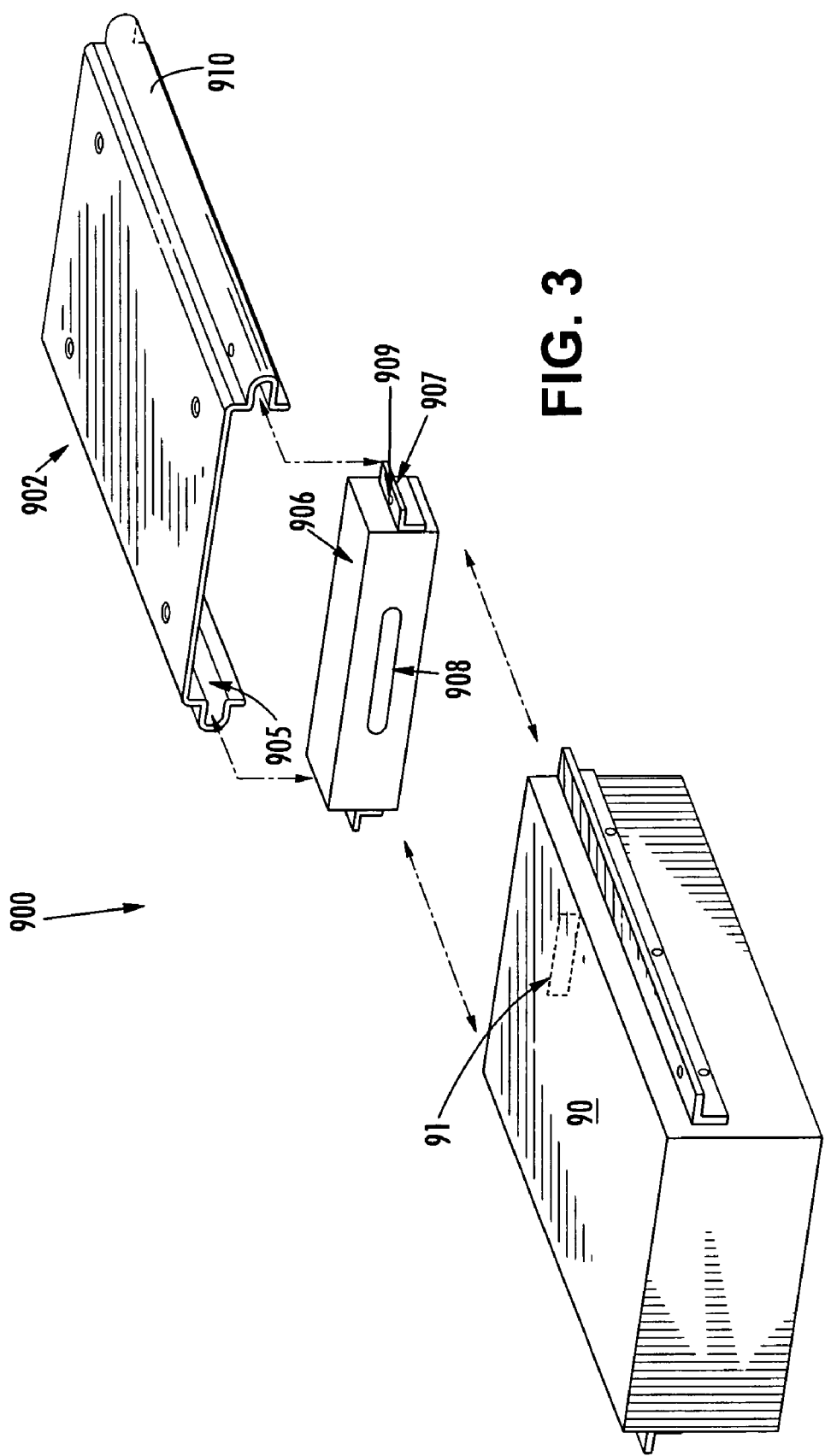
Figure 4:
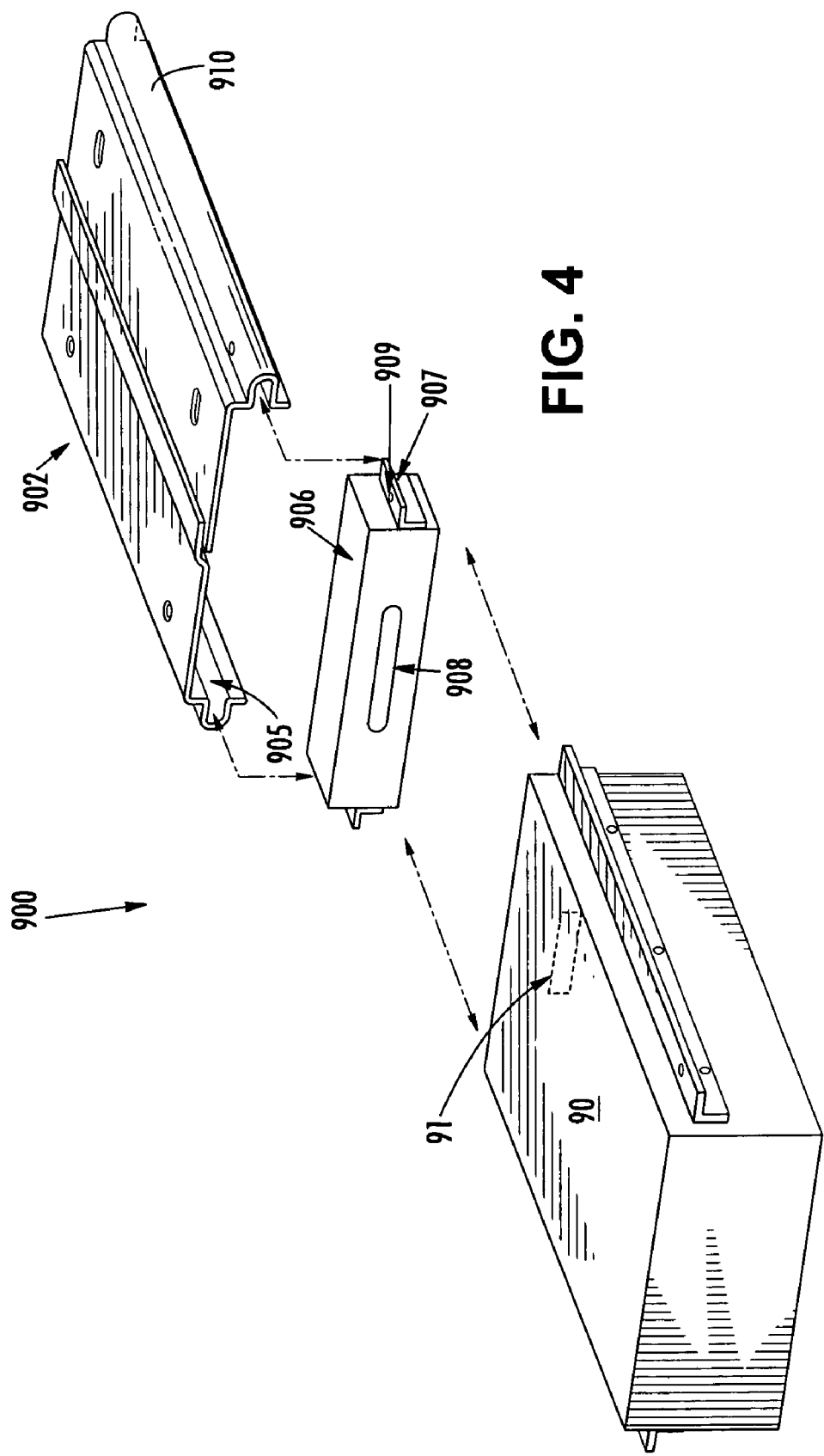
FIG. 4 illustrates a mounting assembly according to one embodiment of the invention.

FIG. 3 depicts an alternative embodiment of the mounting assembly 900 in which the mounting assembly 900 further comprises a modular electrical connector plate 906 with lips 907 positioned along two opposing side faces of the connector plate 906. The lips 907 are positioned such that they will be received into the channel 905 of the mounting bracket 902. An electrical connector 908 is positioned on the face of the connector plate 906 so that when the plate 906 and the testing unit 90 are mounted within the channel 905, the electrical connector 908 on the connector plate 906 is adjacent and mates with the connector 91 on the signal testing unit 90.

The lips 907 on the connector plate 906 have an opening 909, and the channels 905 on the mounting bracket 902 have an opening 910 that is positioned to align with the opening 909 of the lip 907. A fastener is engaged into the openings 909, 910 to prevent movement of the connector plate 906 relative to the mounting bracket 902. As discussed previously, suitable fasteners include bolts, pins, straps, hook, and any other suitable fasteners known in the art. Alternative embodiments of fastening the connector plate 906 to the bracket 902 include using adhesives, hook/eye closures, and other fasteners known in the art. Although not shown, the connector plate 906 may be formed integrated with the mounting bracket 902.

In all of the embodiments described above, those skilled in the art may choose an appropriate material for the described parts of the mounting brackets and signal testing units. Such materials may include plastics, metals, or other suitable materials. Similarly, the connectors shown may be selected to mate with power sources, antenna, etc., that are being used in the vehicle with the signal testing unit.

That which is claimed:

1. In combination, a signal testing unit and vehicle mounting assembly, comprising:
   a signal testing unit having at least two opposing faces, wherein each of said two opposing faces includes a lip; and
   a bracket for receiving said testing unit, said bracket defining two inwardly opening U-shaped channels and a fastening portion, said fastening portion for mounting said bracket to a surface of said vehicle; and
   a modular electrical connector including two opposing faces, each of said two opposing faces including a lip, wherein said channels of said bracket are positioned each to slidably receive one of said lips of said signal testing unit and one of said lips of said modular electrical connector, said signal testing unit and said modular electrical connector being separable from said bracket, wherein said testing unit further includes an electrical connector for mating with said modular electrical connector when said modular electrical connector and said testing unit are mounted onto said bracket.

2. The combination of said testing unit and said vehicle mounting assembly of claim 1, said bracket further including:
   a center segment intermediate said U-shaped channels, said center segment including a first panel and a second panel;
   wherein said first panel is in slidable contact with said second panel such that when said first panel is moved relative said second panel, said U-shaped channels move relative to each other.

* * * * *